(12) United States Patent
Budd et al.

(10) Patent No.: US 7,581,048 B1
(45) Date of Patent: *Aug. 25, 2009

(54) METHOD AND APPARATUS FOR PROVIDING CONTINUOUS COMMUNICATION BETWEEN COMPUTERS

(75) Inventors: Robin Budd, Seattle, WA (US); Arieh Don, Brookline, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 839 days.

This patent is subject to a terminal disclaimer.

(21) Appl. No.: 09/895,466

(22) Filed: Jun. 29, 2001

(51) Int. Cl.
G06F 13/14 (2006.01)
G06F 11/14 (2006.01)

(52) U.S. Cl. .................. 710/74; 710/38; 714/43

(58) Field of Classification Search .............. 709/220, 709/221, 250; 710/52
See application file for complete search history.

(56) References Cited

U.S. PATENT DOCUMENTS

| | | | | |
|---|---|---|---|---|
| 5,228,083 | A * | 7/1993 | Lozowick et al. | 713/160 |
| 5,335,352 | A | 8/1994 | Yanai | |
| 5,812,748 | A * | 9/1998 | Ohran et al. | 714/4 |
| 5,948,079 | A * | 9/1999 | Tsai et al. | 710/20 |
| 6,101,497 | A | 8/2000 | Ofek | |
| 6,141,324 | A * | 10/2000 | Abbott et al. | 370/236 |
| 6,327,625 | B1 * | 12/2001 | Wang et al. | 709/235 |
| 6,421,676 | B1 * | 7/2002 | Krishnamurthy et al. | 707/102 |
| 6,526,049 | B1 * | 2/2003 | Murata | 370/389 |
| 6,529,518 | B1 * | 3/2003 | Webber | 370/403 |
| 6,731,596 | B1 * | 5/2004 | Chiang et al. | 370/217 |
| 6,763,479 | B1 * | 7/2004 | Hebert | 714/4 |
| 6,799,317 | B1 * | 9/2004 | Heywood et al. | 719/313 |
| 7,096,269 | B2 * | 8/2006 | Yamagami | 709/229 |
| 7,275,100 | B2 * | 9/2007 | Yamagami | 709/224 |
| 2003/0002508 | A1 * | 1/2003 | Dierks et al. | 370/395.52 |

FOREIGN PATENT DOCUMENTS

JP 10161955 A * 6/1998
WO WO 92/18931 * 10/1992

OTHER PUBLICATIONS

Information Sciences Institute, "Internet Protocol DARPA Internet Program Protocol Specification", p. 49, (Sep. 28, 1981).
3COM/Microsoft Corporation, "Network Driver Interface Specification", (Oct. 5, 1990).

* cited by examiner

Primary Examiner—Ilwoo Park
(74) Attorney, Agent, or Firm—Krishnendu Gupta; Joseph D'Angelo

(57) ABSTRACT

A system and method for providing continuous availability of information that is normally transported via a network is provided. The system and method uses a process that is used with each computer in a system to simulate the functionality of a network interface card wherein upon the unavailability of the network, transmission packets containing a unique header are send by one application in the system through the process, which stores the transmission packets in queue, and upon filling of the queue writes filled queue to a send volume contained on a storage system. The storage system then copies the data to a second volume, which can be read by a second application. The first and second volumes can either be remotely dispersed or local to one another.

14 Claims, 7 Drawing Sheets

METHOD AND APPARATUS FOR PROVIDING CONTINUOUS COMMUNICATION BETWEEN COMPUTERS

FIELD OF THE INVENTION

The invention relates generally to communications between two or more computers in a network, and more particularly to a method and apparatus for providing an alternative communication path if the network is unavailable by choice or by design.

BACKGROUND OF THE INVENTION

Many computer systems include one or more computers or processors and one or more storage systems that store data used by the computers. These computer systems will have the one or more computers remotely dispersed and connected to one another over a wide area network (WAN) or the Internet. Often these computer systems will also have the one or more storage devices remotely dispersed over a communication medium capable of transmitting data over long distances. An example of such a system is shown in FIG. 1, and includes computers 12, 13 and storage systems 20 and 21. The computers 12 and 13 typically include processors or Central Processing Units (CPUs) 14 and 15 and host bus adapters 16 and 17 respectively that each controls communications from the computer to the storage systems 20 and 21 via a corresponding one of the communication buses 18, 19. It should be appreciated that rather than a single processor 14 and 15, each of the computers can include multiple processors. The communication buses 18, 19 shown in FIG. 1 can be any number of different types of communication links. For example, each of the communication links 18, 19 could be implemented as a small computer systems interface (SCSI) bus or in the alternative communication between the computers 12, 13 and the storage systems can be performed over a Fibre Channel fabric, utilizing various communication protocols such as Fibre Channel, or iSCSI or internet protocol (IP), that takes advantage of the communication buses.

Each storage system 20, 21 typically includes a plurality of storage devices on which data is stored. In the system shown in FIG. 1, each storage system includes a plurality of disk drives 28a-n, 29a-n and a plurality of disk controllers or back end adapters 26a-n, 27a-n that control access to the disk drives 28a-n, 29a-n. Each storage system 20, 21 further includes a plurality of storage bus directors or computer or front end adapters 22a-n, 23a-n that control communication with the computers 12, 13 over the communication links 18, 19. Each storage system 20, 21 further includes a cache 24, 25 to improve the performance of the storage system. In particular, when the computer 12 executes a read operation from the storage system 20, the storage system 20 may service the read from the cache 24 (when the data is stored in cache), rather than one of the disk drives 28a-n to execute the read more efficiently. Similarly when the computer 12 executes a write command to the storage system 20, the corresponding storage bus director 22 can execute the write to the cache 24. Thereafter, the write can be destaged, in a manner transparent to the computer, to one of the appropriate disk drives 28a-n. Finally each storage system includes an internal bus 31, 33 over which the storage bus directors 22, 23 disk controllers 26,27 and the cache 24,25 can communicate.

Still referring to the system of FIG. 1, the system 10 further includes connections between each of the computers 12 and 13. This connection is shown with an Internet connection 32 being the communication link between the computers 12 and 13. Each computer 12,13 also is connected to an Ethernet network 38, 39 which in turn is each connected to a router 34, 35 which serves as to connect each computer 12, 13 to the internet. Each Ethernet network 38, 39 also serves to connect or couple computers 12, 13 to one or more workstations 36a-n, 37a-n which are available to be used by a plurality of users of the computers 12, 13. It should be understood that the communication link shown in FIG. 1 as the Internet connection 32 could also be any type of wide area network (WAN) as is well known in the art.

It should also be appreciated that the present invention is not limited to situations where the computers are directly connected to the storage systems. One or more computers may be connected to one or more storage systems using a network with requests and responses being forwarded to the storage systems according to the protocol of the network. One exemplary network in which the present invention may be employed is a Fibre Channel network, although the present invention is not limited to use of a Fibre Channel network or any other particular network configuration.

FIG. 2 illustrates a network 51 arranged in a fabric configuration where communication between the various components are coupled together by a switch 50. Communication, except for the link 30, is controlled by the switch 50. The present invention also contemplates networks arranged in other configuration such as a loop configuration (not shown) or alternatively in a hybrid arrangement wherein one storage system is connected to a fabric while a second storage system is connected in a loop configuration.

Turning back to FIG. 1, The storage systems 20, 21 also are connected with a high speed communication link 30, which will be described. The data stored on data storage system 20 may be crucial to the operation of the computer 12. Therefore, a contingency solution is desirable in the event that a problem is experienced with storage system 20 to ensure that the data is not lost and to minimize the risk of computer 12 being down or unavailable due to issues with the storage system 20. Potential problems with the storage system 20 can include hardware and/or software errors that may make stored data unrecoverable, as well as catastrophic events such as an earthquake, power shortage or other natural disaster that could result in the destruction or unavailability of the storage system. One solution for protecting the data stored in storage system 12 is to mirror the data into another storage system, such as storage system 13, as will be described.

However, with the advent of clustering programs or applications such as Microsoft Cluster Server or Veritas Cluster Server, that operate on the computers 12, 13, it is becoming critical to ensure that the data which is essential to the operation of these type of applications continues to be available to the applications on the computers even when the normal mode of communication between the applications is down or not available.

It would be advantageous therefore, to have a method and device to ensure that even if the normal mode of communication is not available, an alternate communication mode could be made available to make certain that applications can continue to send and receive data critical to the operation of the computer systems.

SUMMARY OF THE INVENTION

The invention is directed to a method and apparatus for providing and alternative communication mode in the event that the primary communication mode is not available. The computer system has a plurality of computers connected to a storage system, where each computer has software that can send and receive information over a network. When the network is not available or is not desired to be used, the information that normally would be sent over a network is still able to be communicated between the applications on the computers by receiving transmission packets into an internal thread and placing the transmission packets into a queue determined by the type of transmission packet. If the transmission packet is a write packet, it is copied into a buffer, and upon the buffer being filled to a predetermined point, the internal thread awakes to process the filled buffer by writing the contents of the buffer to the data storage system.

In another embodiment of the invention, a computer system has a plurality of applications, each in communication with a storage system, and the applications each have a process capable of sending and receiving information over a network to one another. The present invention also has method for providing continuous availability of the information even if the network is not available. The process recognizes that the network is not available, and in response to the unavailability the information that would normally have gone over the network is written from one of the applications to a first volume. The information is then written from the first volume to a second volume where it can be read from the second volume.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

Figure 1:
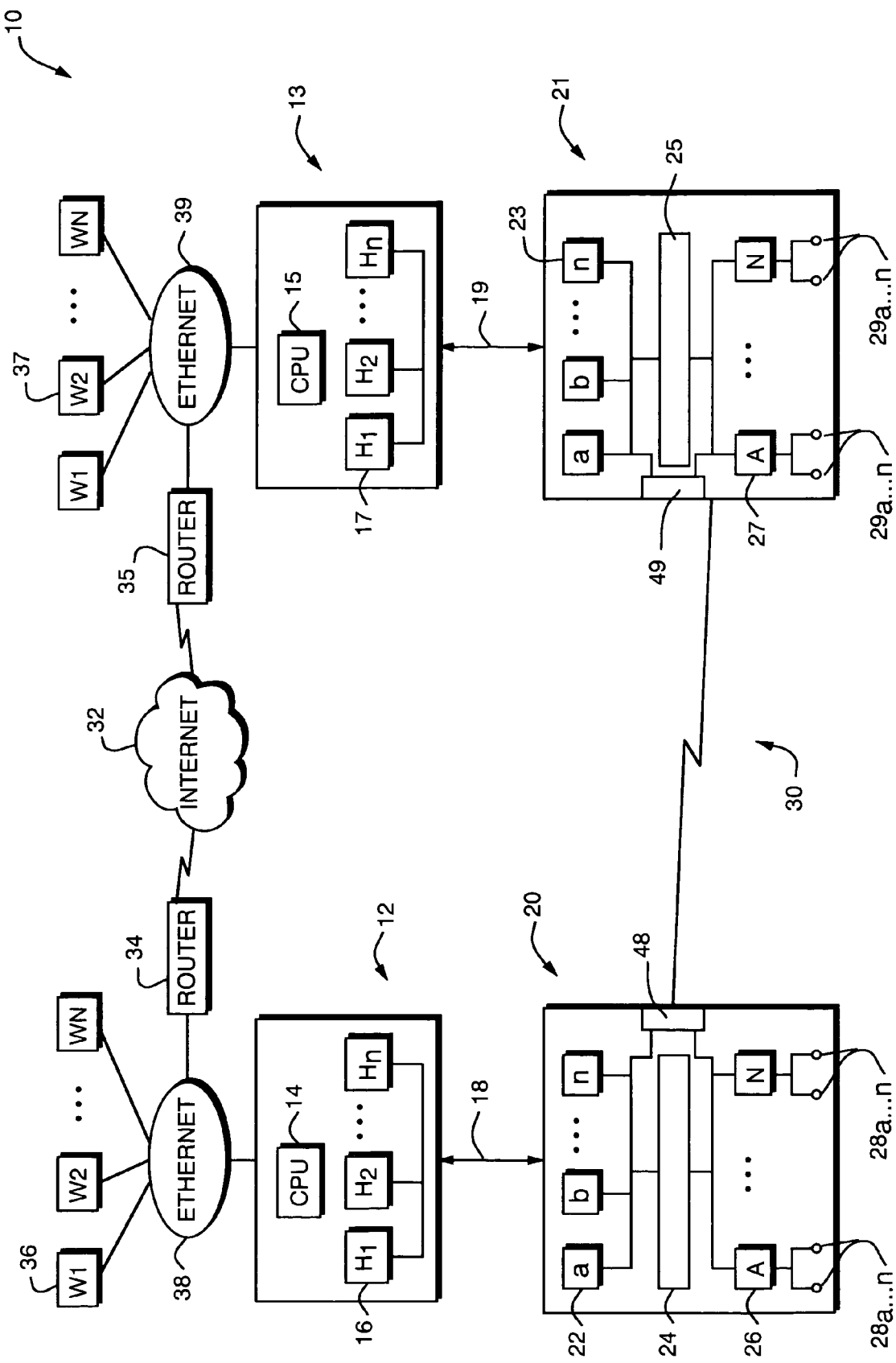
FIG. 1 is a block diagram of a typical computer system in accordance with the present invention.

Although the present invention is not limited to clustering applications, clustering applications are being used for descriptive purposes to highlight some of the reasons and areas in which Applicant's invention may be useful. A clustering application is generally designed to provide for availability management to minimize both planned and unplanned downtime. For example, typical cluster applications such as Microsoft Cluster Server or Veritas Cluster Server are installed into cluster server configurations from 2 to 32 nodes. Referring back to FIG. 1, each computer in the system 10 could be a server running any one of the well known operating systems such as UNIX (or any UNIX variants such as HP-UX or Solaris), NT or Linux. In a clustering environment multiple servers are connected to each other and to the storage systems. A node in a cluster is a member of the cluster that usually comprises a server, including its storage and network resources. In FIG. 1, for example, the system 10 could be considered to have two (2) nodes. In the cluster, the nodes communicate with each other, and if one node fails, applications running on that node fail over to run on healthy nodes. Other forms of clustering include parallel processing or load balancing. In parallel processing, availability is provided by dividing a large application or task such as On Line Transaction Processing (OLTP) or Decision Support (DSS) into many smaller tasks, and then running the smaller tasks concurrently on several nodes in order to assist in the quicker completion of the larger task. In a load balancing cluster, incoming requests to the nodes are distributed among the nodes in the system. Each server in the cluster is able to handle requests, and in the event of a server failure, the requests can be redistributed among the remaining servers.

An important command thread in these clustering environments, regardless of type, is the fact that the nodes need to communicate with each other. In FIG. 1, the physical set-up for such communication is demonstrated with the internet connection 32 between the computers 12, 13. Typically in a failover type of cluster the two computers or nodes, in this example, monitor the status of each other by communicating with each other over what is known as a heartbeat network, wherein the heartbeats are signals that are periodically broadcast from one system to another to tell the other nodes in the cluster that each node remains active. If the Internet connection 32 were unavailable the nodes would stop receiving responses or status messages from their peers and will automatically assume that a peer node has stopped functioning and implement fail-over procedures. In the event of such a failure, the ownership of resources (such as disk drives and IP addresses) needs to be transferred from a failed node to a surviving node. It can be seen then that the communication link with the Internet 32 at its core is essential to the operation of the system 10. As indicated, it should be understood that although a clustering application is described here as one application which can make use of the present invention, the application certainly is not limited to clustering applications. The present invention contemplates use by any application which has a need to communicate with each other, and typically does so over a standard network, using standard network transport services to perform such communications. Another example of an application that can use Applicant's invention is any type of browser application such as Microsoft's Internet Explorer or Netscape Navigator. Other applications, for example, would include e-mail.

Regardless of whether the communication link is Internet based or is a WAN, it is typical that such communication links use the Internet Protocol (IP Protocol) to provide the data transport services for the communication link. Every other Internet protocol, such as TCP is either layered atop of the IP Protocol or is used to support IP from below. The IP Protocol's primary function is to transmit or forward IP packets. The IP Protocol is explained more fully in the Internet Protocol Specification, as is well known in the art. The IP Specification was published in September of 1981 and is also known as Request for Communications (RFC) 792, as defined by the Internet Engineering Task Force (IETF). The IP Specification is fully incorporated herein by reference.

Figure 4:
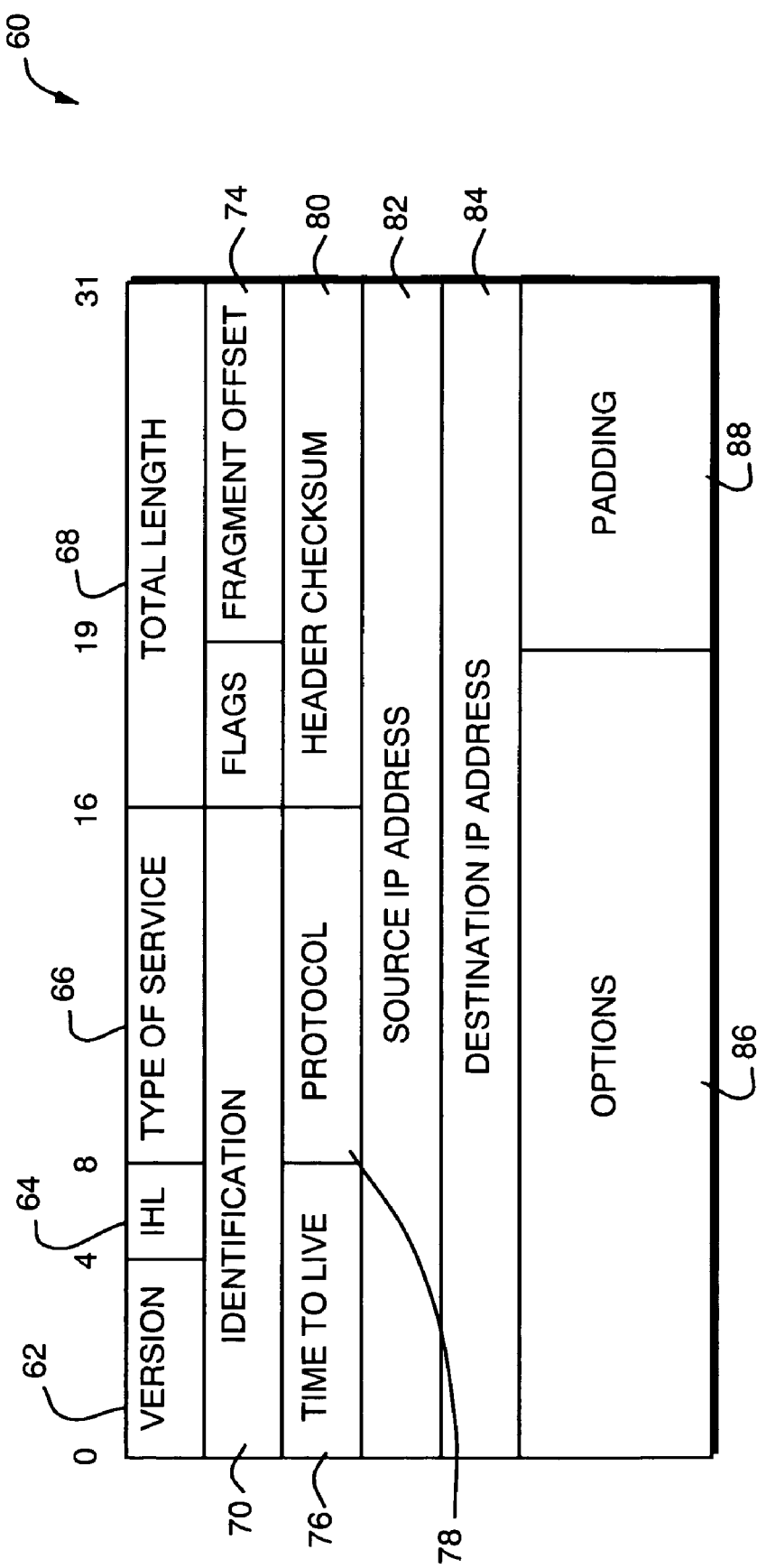
FIG. 4 is a block diagram showing the structure of an IP packet.

At a high level, the IP Protocol is a packet-oriented protocol that treats each packet independently. This means that each packet must contain addressing information. A typical IP packet contains an IP header followed by a variable length data field. FIG. 4 shows the structure of the IP header shown as 60. The Version Field 62 indicates the format of the header. Internet Header Length (IHL) 64 is the length of the internet header in 32 bit words and serves to point to the beginning of the data. The Type of Service Field 66 provides an indication of the parameters of the quality of service desired. The parameters are used to guide the selection of the actual service parameters when transmitting a packet through a particular network, and thus specify the treatment of the packet during its transmission through the internet or network. The choices for these parameters involve tradeoffs between low-delay, high reliability and high-throughput. The Total Length Field 68 is the length is the length of the packet, measured in octets, including internet header and data. All computers (hosts) need to be able to accept datagrams of up to 576 octets. The field allows the length of the packet to be up to 65,535 octets, even though such a length is usually impractical for most computers and networks. The Identification Field 70 is an identifying value assigned by the sender to assist in assembling the original datagram from packets. The Flags 72 are for various control flags. The Fragment Offset 74 Field is to indicate where in the datagram a particular fragment belongs. It is usually measured in bits of 64, while the first fragment has offset zero (0). The Time to Live Field 76 indicates the maximum value time the datagram is allowed to remain in the internet system or network. If the field contains a value of zero (o) the datagram must be destroyed. The field is also modified in internet header processing. The time in the field is measured in units of seconds, but since every module that processes a datagram must increase the Time to Life field by at least one even if it processes the datagram in less then a second, the field should only be thought of as an upper bound on the time a datagram may exist. The intention of this is to cause undeliverable datagrams to be discarded and to bound the maximum datagram lifetime.

The Protocol Field 78 indicates that the next level protocol used in the data portion of the internet diagram. The Header Checksum 80 is a checksum on the header only. For those header fields that change (i.e. Time to Live) this is recomputed and verified at each point the internet header is processed. The Source IP Address 82 indicates the source address of the sending computer, while the Destination IP Address 84 indicates the destination or target address of the receiving computer. The Options Field 86 is for the options that may or may not appear in datagrams. Generally, they are implemented by all IP modules, including host computers, but in any particular datagram their transmission optional. Some of the options include Security, Record Route, Stream Identifier, Internet Timestamp, End of Option List, No Operation, Loose Source and Record Route, Strict Source and Record Route, Record Route and Stream Identifier. Lastly, the Padding field 88 is used to ensure that the internet header ends on the 32 bit boundary. If the datagram does not end on a 32 bit boundary, padding or extra bits may be added to the datagram to ensure that the header ends on the desired boundary.

Turning back to the data storage system 20 of FIG. 1, the controllers of the data storage systems 20 are connected by means of a high-speed communication link 30 to a controller on another or secondary data storage system 21. Such high speed, communication links 30 between first and second data storage systems 20, 21 may include a fibre optic link driven by an LED driver per IBM ESCON standard; a fibre optic link driven by a laser driver, and optionally T1 and T3 telecommunication links. Utilizing network connections, first and second data storage systems 20, 21 may be connected to FDDI networks, T1 or T3 based networks and sonet networks. Before explaining further details of each host computer or node in the system, an overview will be provided as to the remote mirroring capabilities of data storage systems 20, 21.

Turning back to FIG. 1, data storage systems 20, 21 will now be described in further detail. In this example primary data storage system 20, in this example, includes front end adapters 16*a-n* which interfaces with the computer 12 and receives data from the computer 12 over a communication bus 18. Data received from the computer 12 is typically stored in cache 24 before being transferred through storage bus adapters or disk adapters 26*a-n* over an internal bus 31 to the primary storage devices 28*a-n*. The storage devices may include physical devices such as disk drives, optical disks or other storage devices. The plurality of data storage devices on all of the storage systems in the system, may have various volumes (both logical and physical).

The primary data storage controller also includes a data director (not shown) which executes one or more sets of predetermined microcode to control data transfer between the computer 12, cache memory 24 and the storage devices 28*a-n*. Although the data director may be a separate unit, any of a front-end adapters 22*a-n* or back end adapters 26*a-n* may be operative as a data director to control the operation of a given data storage system controller. Such a reconfigurable channel adapter and disk adapter is disclosed in U.S. Pat. No. 5,335,352 entitled Reconfigurable, Multi-Function Data Storage System Controller Selectively Operable as an Input Channel Adapter and a Data Storage Unit Adapter, and which is fully incorporated herein by reference.

Primary data storage system 20, according to one embodiment of the invention, also includes a service processor (not shown) coupled to primary data storage system 20, which can provide monitoring, repair, service or status access to the storages system. The storage system 20 also may include a secondary disk adapter 48. Secondary disk adapter 48 is coupled via the high speed communication link 30 to the other secondary disk adapter 49, possibly remote data storage system 21.

It should be understood in this type of mirroring, that the secondary data storage system 21 is located at a second site geographically removed from a first site that contains the primary data storage system 20. A geographically removed site can mean that both data storage systems are in a common building or are not in a common building. The present invention contemplates to providing data continuity to nodes that are not located at the same geographic site. Depending on the type of communication link utilized the distances between the data storage system may be relatively short, such as 2-3 kilometers, as would be the case for an ESCON link, or up to extended distances of greater than sixty kilometers, as would be the case for a T1 or T3 link or other types of links as more fully described in U.S. Pat. No. 5,742,792 entitled Remote Data Mirroring and pending U.S. patent application Ser. No. 09/085,868 entitled Method and Apparatus for Interfacing Two Remotely Disposed Devices Coupled Via a Transmission Medium and both fully incorporated herein by reference.

As in the case of the primary data storage system 20, the secondary data storage system 21 includes, in addition to the secondary data storage system controllers containing host bus adapters 23*a-n* and storage bus adapters 27*a-n*, a storage devices, 29*a-n*. As with the primary data storage system 20, the storage devices 29*a-n* may have various volumes and usages, in particular where 28*a* for example, is a primary storage device for storage system 20 and 29*a* which is a primary storage device for storage system 21. As in the case of the primary data storage system 20, the secondary data storage system 21 also may include a secondary disk adapter 49.

Figure 3:
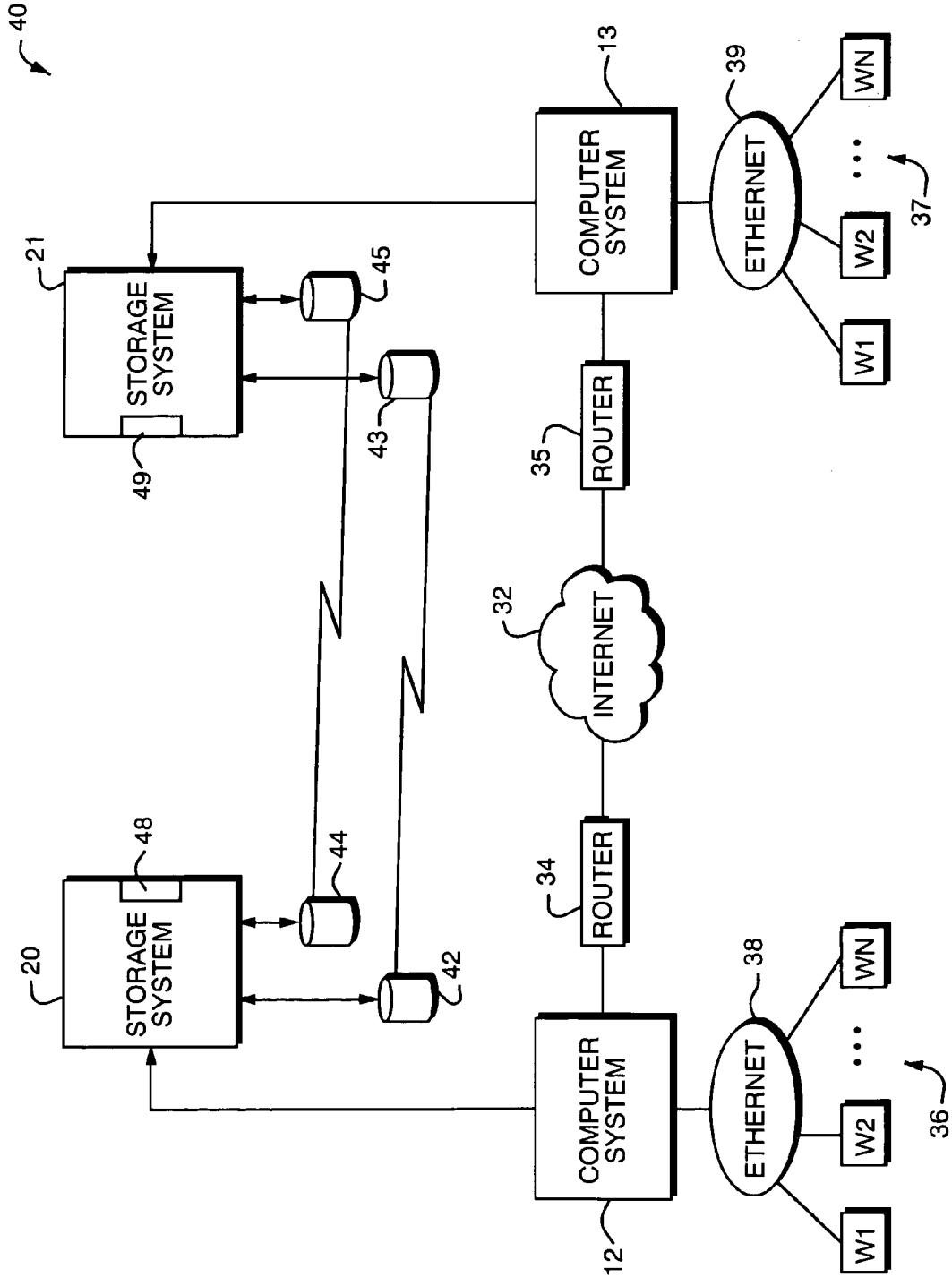
FIG. 3 is a block diagram showing additional aspects of the storage systems shown in FIG. 1.

It should be understood that each physical storage device in storage system may also include a secondary volume (not shown) which serves as secondary storage for the primary data stored on volume of the primary data storage device 28*a-n*. Similarly, the primary data storage system 20 may include a secondary storage volume which stores primary data received from and copied from the secondary storage system 21. For purposes of this description, primary storage volumes are referred to as (R1) volumes, while secondary volumes are referred to as (R2) volumes (not shown) in FIG. 3 shown as 40. Additionally, each storage device in the storage system may include one or more local volumes, which are, in normal operating fashion, accessed only by their locally connected computer.

The secondary storage system 21 also includes at least one a front end adapter 23 which may receive data from a connected secondary computer 13. Optionally, the primary host computer 12 may include a data signal path (not shown) to connect directly into a front end adapter 23 of the secondary data storage system 21. Additionally, the secondary host computer 13 may include a data signal path (not shown) directly into a host bus adapter 22 of the primary data storage system 20.

The high speed communication link 30 between the primary and secondary data storage system 20 and 21 is such that multiple links between the primary and secondary storage system may be maintained for enhanced availability of data and increased system performance. The number of links is variable and may be upgradeable. Additionally the service processor (not shown) of the secondary storage system 21 may also be coupled for remote system configuration, remote software programming, and a base point of control for the secondary storage system 21. Optionally, service processor may be in communication with a service processor on the other data storage system through a separate communication link (not shown).

The remote mirroring facility is designed to provide for the copying of data from a primary data storage unit, e.g. storage system 20 to physically remote secondary data storage system, e.g. 21 transparent to the user and external from any influence of the primary host computer 12 which is coupled to the storage system 20.

The remote mirroring facility is designed to operated in at least two modes, the first being a real time or synchronous mode wherein the primary and secondary storage system must guarantee that the data exists and is stored in two physically separate data storage units before input/output (I/O) completion; that is, before the host computer is notified that a copy of the data has been made. Alternatively, the remote mirroring facility is designed to operate in a point in time or asynchronous mode wherein the data is copied to the remote or secondary data storage system asynchronously from the time when the primary or local data processing system returns an I/O completion signal to the primary host computer.

Thus, in the real time or synchronous node, the primary data storage system 20 automatically controls duplication or copying of data to the secondary data storage system 21 transparently to the primary host computer. Only after data is stored in both the primary and secondary data storage systems as detected by an acknowledgement the secondary storage system to the primary storage system, does the primary data storage system acknowledge to the primary host computer that the data is indeed synchronized.

In the second, point in-time or asynchronous mode of operation, the primary data storage system 20 transparently duplicates data to the secondary data storage system 21 after the primary data storage system acknowledges to the host computer that the data has been written to the storage device and the I/O operation has been completed. This assists in eliminating the performance impact of data mirroring over longer distances. Since the primary and secondary data are not synchronized, the primary data storage system must maintain a log file (not shown) of pending data, which has yet to be written to the secondary storage device. Such data may be kept on removable, non-volatile media, in the cache memory of the primary or secondary data storage system.

In order for the clustering application environment to fully utilize the functionality provided by the mirroring capabilities of the storage systems, in the preferred embodiment of the invention the clustering software works with an additional software process to manage the mirroring resources on the storage system, including controlling the mirroring operations. The process should also include an interface between the configurations required for the mirroring operations and the resource definitions of the clustering software. Combining a clustering application with the additional software provides the ability to use the clustering software to move appropriate network and disk resources, as well as letting the additional software ensure that availability of data resources is coordinated with changes in the network resources. In the environment described this additional software process will reside between the clustering software and the storage system. Such a software product is marketed and sold by EMC Corporation, assignee of the present invention, under the name of GeoSpan™.

Figure 7:
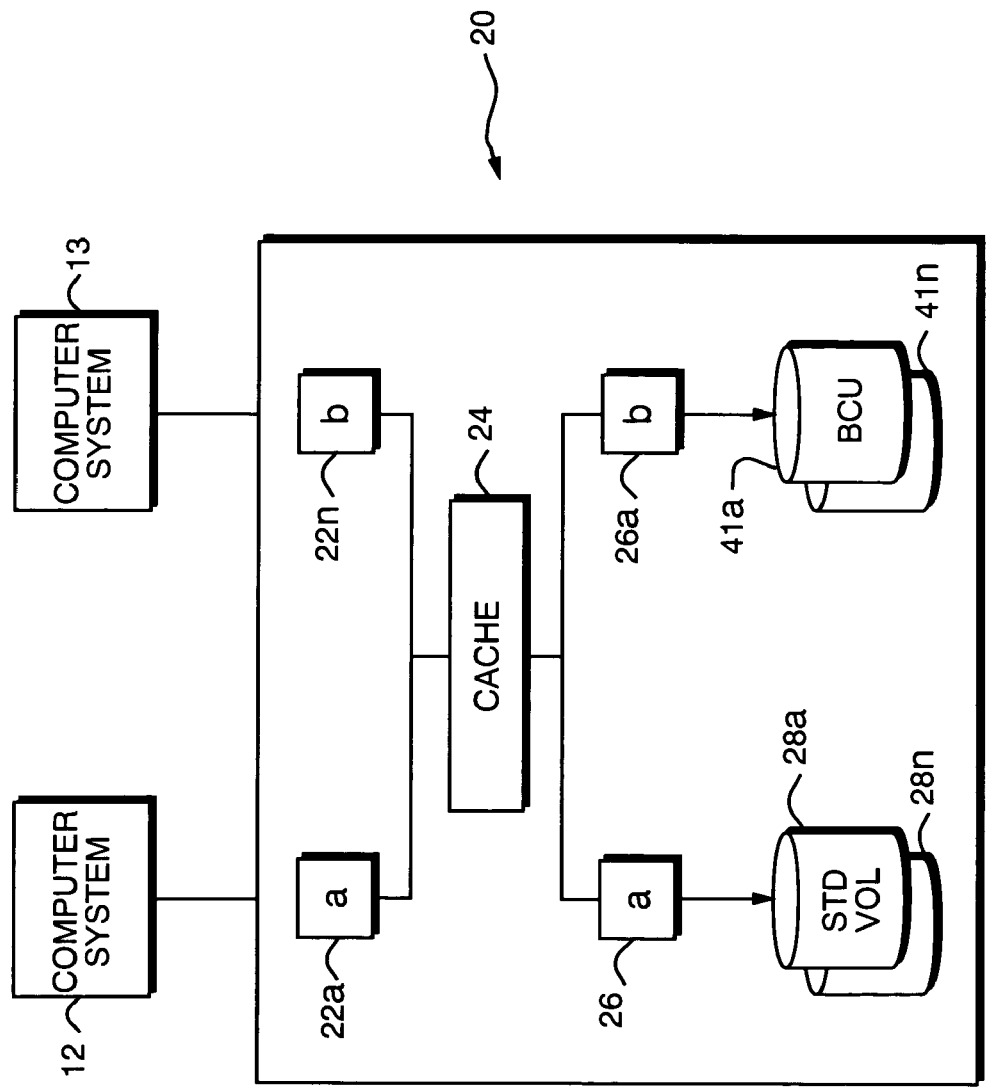
FIG. 7 is a block diagram showing an alternative arrangement of the computer system in accordance with the present invention.

Before proceeding further, in addition to the remote mirroring previously described, the present invention can also be used with any process or system that allows for the duplication or mirroring of a set of data or volumes (both logical and physical). U.S. Pat. No. 6,101,497 entitled Method and Apparatus for Independent and Simultaneous Access to a Common Data Set describes a way to have concurrent access to a data set at a single site within a single storage system. In other words, instead of remotely mirroring the data as previously described, Business Continuance Volumes (BCVs) are created. This enables a first computer connected to a storage system to work with or respond to one type of application, such as the aforementioned OLTP, while another computer also connected to the storage system could work with or respond, using the same data, to another application such as a backup or other OLTP application. FIG. 7 shows a representation of a single storage system 20 shown being connected to a plurality of computers 12 and 13. As described in U.S. Pat. No. 6,101,497 a series of steps or commands are used to set up the BCV volumes 41a-n, use then while making certain data integrity is maintained. For purposes of the present application, it is sufficient to understand that the data is copied from one volume, such as 26a, to a BCV volume 41a, so the data in the BCV volume can be used by a second computer or application.

In the clustering application environment previously described, it is essential to make certain that data critical to system operation can be transported between the computers 12 and 13 (FIG. 1) even in the event that the Internet 32, the WAN or any part thereof fails or is not available. Still referring to FIG. 1, if the Internet connection 32 were to fail, in previous systems, the datagrams that would normally pass between the computers 12 and 13 would go undelivered, even though both computers 12 and 13 were still operating correctly. The result of this would be that each computer 12 and 13 would believe that the other had failed, as neither node in the cluster would receive heartbeats from the other nodes, the clustering service running on each computer would initiate fail over procedures. That is, each node would assume the other node(s) failed and each initiate their fail-over sequence. This situation always will cause a node in a clustering application to expend unnecessary resources in effectuating the failover. However, if the nodes do not share applications, this situation is particularly troublesome. For example, if one node primarily handles e-mail while serving as a backup for inventory and time reporting while the other node handles inventory and time reporting, while serving as a backup for e-mail, the failover sequence will cause each node to attempt to take over the workload of the other node. This leads to a dysfunctional overall system as each node will be competing to handle all of the operations of the entire system. If there existed an alternative transport mechanism that could provide the same functionality, the heartbeat datagrams, in this example, would continue to be delivered, just as if the primary communication mode were available. Therefore, an unnecessary failover would not be initiated.

Figure 2:
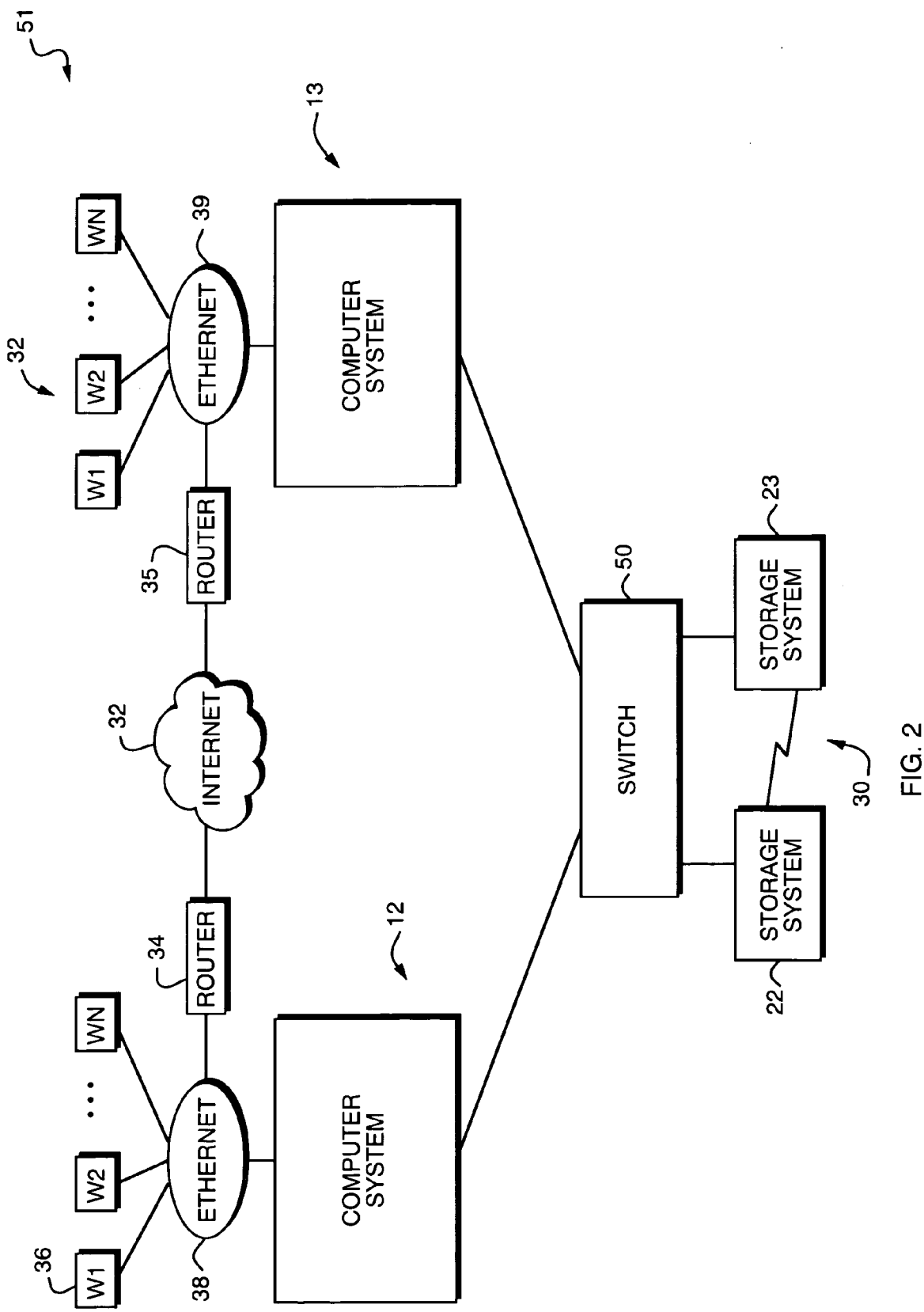
FIG. 2 is a block diagram showing an alternative arrangement of the computer system of FIG. 1.

One solution for accomplishing this is to provide an alternative transport mechanism that allows for network data, in the form earlier described, to be transferred by means other than the actual network, without having to set up a redundant network that would solely be used as a replacement for the primary network. This solution can work within the existing systems and software shown and described in FIG. 1 and FIG. 2 without the need to set up yet another network. In looking at FIG. 1, there are two ways that the computers 12 and 13 are connected. The first is the traditional internet or network with Internet 32 at is center. Second, the storage systems 20 and 21 also, although not directly, connect the computers 12 and 13. When the storage systems 20 and 21 have the mirroring capabilities previously described, whether remote mirroring or single system mirroring, when combined with software (as will be more fully described), an alternative exists for the transport of networked data in the event that the primary network is not available.

At a high level the mirroring capabilities of the storage systems 20 and 21 (or single storage system 20) are used for the transport of data which normally would have gone over the network. Generally, in the remote mirroring scenario, computer 12 writes network data to an R1 volume in storage system 20, which is then mirrored to and R2 volume in storage system 21. Then computer 13 can read the mirrored network data from the R2 volume. In turn, computer 13 writes its network data to an R1 volume on storage system 21, which is mirrored to an R2 volume on storage system 20, where it can be read by computer 12. In the single storage system embodiment, computer 12 writes data to the volume or volumes at 28a-n through the appropriate back-end directors 26a-n. The volumes 28a-n are then copied by a copy program to the BCV volumes 41a-n, where it is available and can be read by an application on computer 13.

Figure 5:
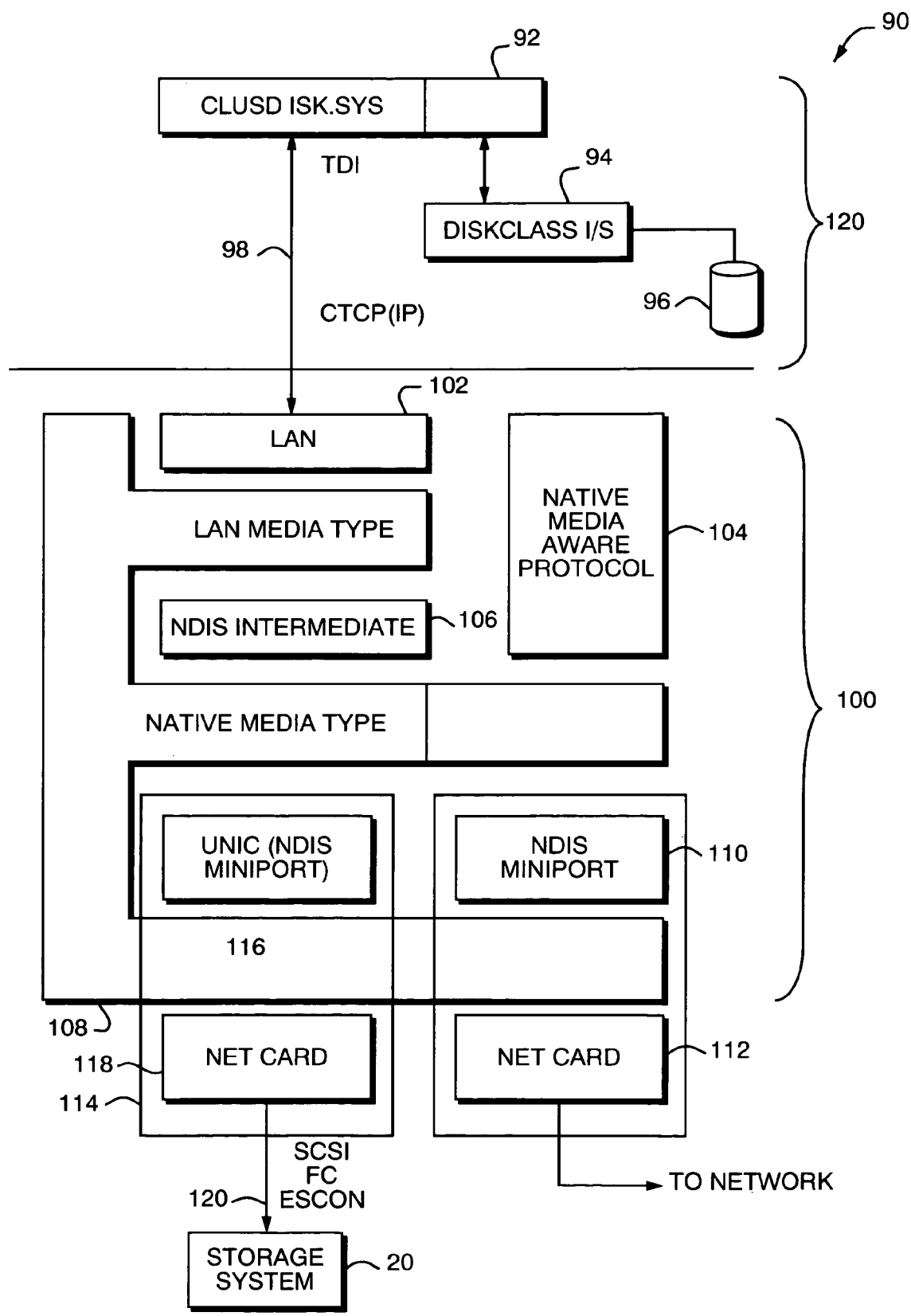
FIG. 5 is a block diagram showing the environment of the software used in the computer system of FIG. 1.

The software that runs on computers 12, 13 to accomplish the operations of the present invention, is comprised of a single processes. In the preferred embodiment of the invention, the process is a kernel-mode driver, which needs to simulate the functionality of a network card, so that as far as the applications are concerned there is another NIC in the system. A network card, often called a network interface card (NIC) is usually an expansion board that is included with a computer so that the computer can be connected to a network. Most NIC's are designed for a particular type of network, protocol and media, although some can serve multiple networks. The process when installed onto the computer must be, transparent to the computer and the other components in the system 10. In other words, the software must be indistinguishable from a real NIC. For illustrative purposes only, this process will be referred to as a Virtual Network Interface Card (VNIC) process. FIG. 5 is a logical representation demonstrating the operating environment of the VNIC process within a Windows NT operating system shown as 90. In one embodiment of the invention the VNIC process is implemented as a Network Driver Interface Specification (NDIS) miniport driver. Typically, the primary purpose of NDIS is to define standard Application Programming Interfaces (APIs) for NICs. Since a NIC is normally a piece of hardware, the implementation of such is wrapped with some sort of device driver, such as a media access controller (MAC) so that all NICs for the same media (i.e. Ethernet) can be accessed using a common programming interface. NDIS also provides a library of functions, sometimes called a wrapper, that can be used by device drivers as well as higher level protocol drivers (such as TCP/IP). A miniport driver typically replaces platform-specific functionality with platform independent "wrapper" functions. Therefore, in one embodiment of the invention, the VNIC process is implemented as an NDIS miniport driver that simulates the existence of an Ethernet adapter. Since the VNIC process is a kernel based piece of the operating system it will be called on many different threads (or programs) executing simultaneously. Because the VNIC process must respond to these externally generated events, it spins up an internal thread, to provide synchronized access to critical data performing time sensitive tasks such as Input/Output (I/O) operations.

FIG. 5 shows the VNIC process 116 within the datalink layer in a Windows NT operating environment, which is shown as 100. By datalink it is meant the layer that governs access onto the network and reliable transfer of packets across the network. As can be seen the VNIC process operates entirely within the kernel of the operating system. As such it interacts with the computer 12 or 13 of FIG. 1 entirely through NDIS-defined functions and protocols. The NDIS specification which is fully incorporated herein by reference is entitled Network Driver Interface Specification, version 2.01, published in 1996 by 3COM Corporation and Microsoft Corporation. Above the datalink layer 100 is the Transport Driver Interface 120 which serves as the interface between higher lever drivers such as those shown as clusdisk.sys 92, that in a clustered application is responsible for ensuring only one node at a time can access a cluster disk, and diskclass.sys 94 that presents logical representations of the disk drives to upper layers in the system via an internal communication mode as shown as 98. In this example, the communication mode is shown as a Transmission Control Protocol over IP suite (TCP/IP). In this example, data comes through the datalink layer through the TDI using TCP/IP, and then can be passed into the NDIS 108 (which includes the other components, such as LAN 102, Native Media Aware Protocol 104, and NDIS Intermediate 106), where depending on destination (i.e. network path) of the data can either head to the network through NDIS miniport 110 and NIC 112 or to the storage system 20 through region shown as 114, which includes VNIC 116 and NIC 118. However, once the data arrives in the NIC 118 or 112, it is placed into the appropriate NIC's buffer for transmission onto the physical medium.

It should be understood the prior to the full implementation of the VNIC processes, the storage systems have to be set up or configured to handle the data that will be sent and received thorough the software process. To that end, on the storage system a volume (physical or logical) is configured to send data and another volume (also logical or physical) is configured to receive data or in a single storage setup one volume is set up as a BCV to receive data.

The VNIC process in operation will transmit packets from the sender, such as User Data Protocol (UDP) packets that normally work with the underlying IP Protocol, not through the primary IP network 32 as shown in FIG. 1, but through an alternative network to the other VNIC process residing on a second computer. To accomplish this in the present invention, such two volume pairs must be configured. The volume pairs can be remotely dispersed or can both be local that is contained in a single storage system. However, the use of two volume pairs should not been seen as a limitation on the present invention, in that a single volume is contemplated so long as the needed information could be contained in a single volume, where the sender writes or places data through he VNIC process into one portion of the logical volume and the data can be read by another application where the data gets to that application through a process such as the VNIC process. In FIG. 3, for example for computer 12 volumes 42 and 44 form the R1/R2 pair for the computer 12, and volumes 43 and 45 form the R1/R2 pair for the computer 13. As indicated in one embodiment, each of the VNIC processes have two (2) volumes, the reason is that since on the VNIC process the receive volume (R2) is an exact copy of the VNIC process' send (R1) volume, the respective volumes have identical files and file structures. Even within a single storage system this is true, the sending application will write data to its standard volume where it will be mirrored to a BCV. Conversely, a second application will write data to its standard volume and mirror it to a BCV one, but the sending application in each case will receive data from another application on a BCV.

It should be understood that the solution uses the ability of the storage system or system to mirror data from one storage system to the other or from one volume to another. When the VNIC process is operating the caching and buffering of the storage systems are disabled. This causes all I/O operations during use of the VNIC process to be done directly to disk, versus through the cache, bypassing the cache, so that the data is mirrored accurately across the two storage systems. The storage systems, when the VNIC process is in use, do not use any filesystem buffering.

Just as the storage systems need to be configured, the network settings also need to be set for the VNIC process on each computer. Each VNIC process must have its own unique IP address since each computer needs to think that the VNIC process is a network adapter. The VNIC processes can be assigned true IP addresses or they may make use of the local, non-routable, addresses within a specified range to avoid Domain Name Service issues.

After the storage system and network has been set up, the VNIC process is loaded into the computers 12 and 13 in a manner similar to any standard network card. In the Windows NT operating system, the standard NT wizard is used. During the installation process, the block size for the packets should also be specified so it is a predetermined size versus being negotiated by and among the computers in the system. Also, as part of the installation process, when a clustering application is present, the VNIC process reads settings from the operating system's registry for each node in the cluster in order to discover the I/O volumes (i.e. send and receive volumes). Once it knows its I/O volumes, the VNIC process creates its internal thread, and then waits for the thread to signal of its successful initialization. The internal thread is the "workhorse" of the system. It ultimately is responsible to accepting transmissions packets from NDIS, writing then to the send volume and performing updates of the state information. The internal thread also polls the receive volume to ascertain if any changes to the state file have occurred. In particular, it looks for new data. Upon receiving a signal that the internal thread has been initialized, the internal thread writes an initialization packet on its send volume. As indicated, the send volume is the R1 volume in the R1/R2 pair or the non BCV volume. If the internal thread cannot create the necessary files on the send volume, the thread terminates and the process is disabled. Assuming successful creation of the files, the internal thread verifies the existence and the accessibility of its receive volume, the R2 volume. Once again if this is not successful, the thread terminates and the process is disabled. If these steps are completed, the internal thread will proceed into its run time loop.

Before describing the run time loop, it should be noted that an application in the system could utilize the alternative path in different ways. For example, an application itself may be configured to automatically choose an alternative path in the event that the standard network connection is unavailable. Therefore, the application could automatically utilize the VNIC process and send data through the storage system(s). Alternatively, the IP protocol, and specifically the address resolution packets (ARP) can assist in choosing an alternative path, wherein the application in essence broadcasts that it needs a new path, and the protocol comes back and informs the application as to what is the best path to take. In other words once the path is selected, and if that path is the storage system path, the VNIC process is available to assist in moving the desired data from one application to another utilizing either one or more storage systems.

Figure 6:
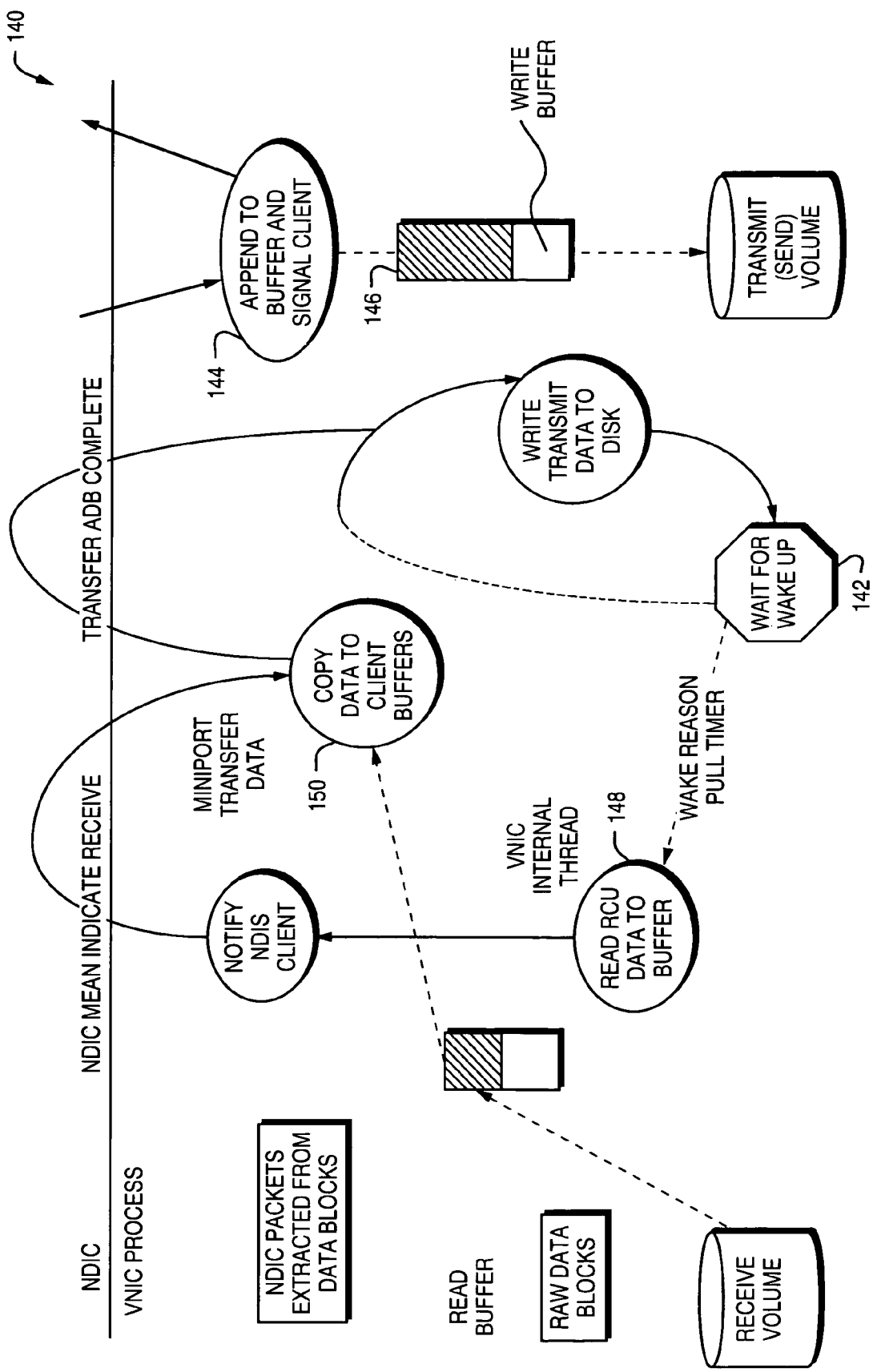
FIG. 6 is a diagram showing the steps used by the software used in the computer system of FIG. 1.

The run time loop 140 is shown in FIG. 6. At step 142 the internal thread is in a wait state, waiting for its path to be used and then waiting for an application to send data. If both are in the affirmative, the client thread at step 144 submits a NDIS packet, which is copied along with a header unique to the VNIC process into the write buffer of the VNIC process. The unique header includes lastRecvdBlock portion that indicates the block number of the last block successfully read from the receive volume. Next, a write wake-up event is signaled from the VNIC process to write the buffer to the disk drives. The NDIS packet data file is structured in predetermined fixed sized blocks, as previously indicated. At step 146 the VNIC processes' internal thread wakes up and processes the write queue by removing it from the write buffer and writing it into the send volume. When the datagrams are copied into the write queue, it should be understood that the write queue is a fixed size circular queue, wherein each datagram is added to the write queue until the write queue is full. The internal thread wakes up when a full block is ready for transmission. Optimally, if a predesignated time interval passes without the internal thread being woken up, the IO thread will then wake up and check for a partial block. If the internal thread finds a partial block, it pads the remainder of the block and writes it to the send volume. There may be a misalignment of the packet and the block boundaries. If this is the case, some packets may potentially be split across different blocks. If this occurs, the VNIC process will wait for a predetermined period of time, such as 200 milliseconds to allow the partially filled block containing the remainder of the last packet put into the write queue to be filled with additional packets. However, if during the predetermined period of time this does not happen, the VNIC process notes the number of valid data bytes in the first 4 bytes of the block and then will write the partially filled block to the storage devices.

At step 148 the VNIC polls the queue on the receive volume to find out if any new data is there. If it finds new data it reads the data and copies the read data into its read buffer. Then the client is informed the data is in the read buffer with a standard NDIS indicate/receive message. After the client is notified at step 150, the client responds by calling the standard NDIS Indicate Receive Packet function to send the packets up through the protocol stack to the client. The VNIC process then extracts the packets of data from the read buffer and then copies the packets into a client buffers. The VNIC process then returns from MiniportTransferData, which then causes the client to return from NDISIndicateReceive. VNIC then calls NDISMTransferComplete to in effect complete the operation. Lastly, (not shown), VNIC processes the write queue and goes back to sleep until the internal thread is woken up again. Preferably, the datagrams need to be delivered in less than five (5) seconds or some other predetermined time interval corresponding to the cluster "time out." Most cluster services, will have a "time out" feature whereby if they do not receive the datagrams or other needed information within this predetermined time period, will initiate failover procedures.

Earlier it was described how the VNIC was loaded and start-up. The VNIC process can also be shutdown. A shutdown request can come from the operating system, like any network card. Upon receipt of a shutdown request, the VNIC process stops accepting requests from the clients. If there are any pending client I/Os they are completed. However, new requests are completed with a status message which indicates to the calling client that the alternative network is unavailable. The VNIC process writes to its state file that it is shutting down, and then closes all files and terminates its internal thread.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

The invention claimed is:

1. In a computer system having a plurality of computers, each connected to a storage system, each of said storage systems in communication via an alternate path, each computer having software capable of sending and receiving network information between said computers via a primary network, a method comprising the steps of:
   receiving transmission packets containing said network information of the primary network including a heartbeat datagram into an internal thread of the primary network and placing the transmission packets into a queue determined by the type of transmission packet;
   upon determination of the unavailability of the primary network, in conjunction with a determination that the storage systems are still available, and the determination that the transmission packet is a write packet, automatically choosing said alternate path and copying the transmission packets into a buffer;
   upon filling the buffer to a predetermined point, waking the internal thread to process the filled buffer, wherein the internal thread writes the contents of the buffer to the storage system and enables transmission of the stored write packets including the heartbeat datagram via said alternate path, said alternate path being implemented as a virtual network interface process which can be shutdown upon receipt of a shutdown request, wherein said stored write packets containing said network information are transmitted in a protocol suitable for said alternate path enabling continuous availability of the network information without use of the primary network between respective ones of the computers.

2. The method according to claim 1, further comprising the step of:
   prior to the internal thread receiving transmission packets, a client thread submits the transmission packets into a write buffer.

3. The method according to claim 1, further comprising the step of:
   calling, by the client thread, a transport data function, wherein the transmission packets are extracted from the buffer.

4. The method according to claim 1, further comprising the steps of:
   configuring the storage system to include a receive volume and a send volume, wherein the contents of the buffer are written to a send volume;
   copying the contents of the send volume to the receive volume.

5. The method according to claim 4, wherein the receive volume and the send volume are respectively located on first and second logical volumes of the storage system.

6. The method according to claim 1, further comprising the steps of:
   configuring the storage system to include a send volume,
   configuring a second storage system to include a receive volume, wherein the second storage system is geographically remote from the storage system;
   writing the contents of the buffer to the send volume; and
   copying the contents of the send volume to the receive volume.

7. The method according to claim 6, further comprising the step of:
   returning the internal thread to a sleep state, after the contents of the buffer are written to the send volume.

8. The method according to claim 7, wherein the copying of the contents of the send volume to the receive volume occurs upon a command from one of the plurality of computers.

9. In a computer system having a plurality of applications, in communication with a storage system, each application having a process capable of sending and receiving information regarding said applications over a primary network to and from the plurality of applications, a method comprising the steps of:
   recognizing that the primary network between the applications is unavailable, in conjunction with a determination that the storage systems are still available;
   in response to the unavailability of the network, automatically choosing an alternate path and writing the application network information of the primary network including heartbeat datagram from one of the applications to a first volume;
   copying the application network information written to the first volume to a second volume system;
   reading the application network information from the second volume; and
   enabling transmission of the application network information including the heartbeat datagram via said alternate path between said respective applications, said alternate path being implemented as a virtual network interface process which can be shutdown upon receipt of a shutdown request, wherein said stored write packets containing said network information are transmitted in a protocol suitable for said alternate path enabling continuous availability of the network information without use of the primary network between respective ones of the computers.

10. The method according to claim 9, wherein the application information is read by the second volume in less than a predetermined period of time after it is written to the first volume.

11. The method according to claim 9, wherein the plurality of applications performs clustering functions.

12. The method according to claim 9, wherein the plurality of applications performs internet browsing functions.

13. The method according to claim 9, wherein the network is the internet.

14. The method according to claim 9, further comprising:
a second storage system geographically remote from the storage system, wherein the fist volume is on the storage system and the second volume is on the second storage system.

* * * * *